(12) United States Patent
Hoh et al.

(10) Patent No.: US 8,818,334 B2
(45) Date of Patent: Aug. 26, 2014

(54) SECURE DATA EXCHANGE WITH IDENTITY INFORMATION EXCHANGE

(75) Inventors: Yong Yik Hoh, Singapore (SG); Qijie Huang, Singapore (SG); Gary Khoo Kah Kean, Singapore (SG)

(73) Assignee: Motorola Mobility LLC, Libertyville, IL (US)

(*) Notice: Subject to any disclaimer, the term of this patent is extended or adjusted under 35 U.S.C. 154(b) by 1163 days.

(21) Appl. No.: 12/273,766

(22) Filed: Nov. 19, 2008

(65) Prior Publication Data

US 2010/0124902 A1    May 20, 2010

(51) Int. Cl.
*H04M 1/66* (2006.01)
(52) U.S. Cl.
USPC ........... 455/411; 455/410; 455/418; 455/419; 455/432.3; 455/41.1
(58) Field of Classification Search
USPC ............. 455/411, 410, 418, 419, 432.3, 41.1; 713/171
See application file for complete search history.

(56) References Cited

U.S. PATENT DOCUMENTS

| | | | |
|---|---|---|---|
| 7,127,613 B2 * | 10/2006 | Pabla et al. | 713/171 |
| 7,140,036 B2 | 11/2006 | Bhagavatula et al. | |
| 2003/0088571 A1* | 5/2003 | Ekkel | 707/100 |
| 2007/0079136 A1 | 4/2007 | Vishik et al. | |
| 2007/0140145 A1* | 6/2007 | Kumar et al. | 370/254 |

FOREIGN PATENT DOCUMENTS

EP    0969644 A1    1/2000

\* cited by examiner

*Primary Examiner* — Manpreet Matharu
(74) *Attorney, Agent, or Firm* — Fish & Richardson P.C.

(57) ABSTRACT

Systems and methods for authenticating authorized users of electronic communication devices, such mobile communication devices, for a secure data exchange between the devices. The authentication of authorized users include multiple levels of user authentication wherein identity profiles of the users are exchanged for user authentication based on identity information obtained or observed from the users.

14 Claims, 7 Drawing Sheets

SECURE DATA EXCHANGE WITH IDENTITY INFORMATION EXCHANGE

BACKGROUND

In the modern electronics driven world, there is wide spread usage of electronic communication devices such as mobile phones, video phones, personal digital assistants (PDA), laptop computers, and smart phones. Electronic communication devices, in addition to providing voice communication, can be used to enable data communication and storage of data communication. An electronic communication device that can provide data communication may be subject to security measures by device users and/or administrators so as to protect sensitive data being communicated.

Typically, security measures for data communication or exchange between electronic communication devices include: a) encryption and decryption of exchanged data with asymmetrical or symmetrical encryption keys, and/or b) authentication between devices that are parties to the data exchange. A concern with the use of encryption keys for encryption/decryption of data is that the encryption keys somehow may be acquired by unauthorized users, who will then employ such keys to conduct fraudulent data communication or exchange with authorized users. Thus, additional security measures must be implemented to safeguard the encryption keys. While device authentication ensures that devices partying to the data communication or exchanged are authorized devices, it does not guarantee that users of the authorized devices are actually authorized users. That is, an authorized device may fall into the hands of an unauthorized user, who will then have the ability to fraudulently conduct data exchange with an authorized user.

Accordingly, there is an interest in authenticating not only electronic communication devices for authorized data communication but also users of such electronic communication devices to prevent unauthorized users from fraudulently accessing sensitive data and/or fraudulently transmitting data to authorized users.

SUMMARY

In one embodiment, there is provided a method of securing a data exchange, comprising: requesting data from a data source; receiving identity information of the data source as a result of the requesting; encrypting the identity information of the data source; transmitting the identity information of the data source as encrypted to request authentication of the first identity information; and receiving the requested data along with an identity profile of the data source for use to authenticate the data source.

In another embodiment, there is provided a method of securing a data exchange, comprising: receiving a request for data; providing identity information in response to the request for data; receiving an identity profile identifying a source of the request for data; verifying the data-requesting source with the received identity profile; and upon successfully verifying the data-requesting source, providing the data in response to the request for data.

In still another embodiment, there is provided a method of securing a data exchange from Central Server's viewpoint, comprising: storing a first identity profile of a first party to the data exchange, the first identity profile establishing an identity of the first party; storing a second identity profile of a second party to the data exchange, the second identity profile establishing an identity of the second party; receiving initial identity information from a first party (e.g., User B), wherein the initial identity information is for identifying a second party other than the first party; verifying the initial identity information with the second identity profile associated with the second party; providing to the second party the first identity profile associated with the first party for use by the second party to verify the first party as an authorized party for the data exchange; receiving requested data from the second party; and providing the requested data along with the second identity profile to the first party, wherein the second identity profile is for use by the first party to verify an identity of the second party.

BRIEF DESCRIPTION OF DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to various embodiments described herein, when two users use electronic communication devices for secure data exchange, their identities are authenticated with one another via such devices prior to the data exchange. Thus, discussed herein are embodiments that allow users of electronic communication devices to use such devices to assist with authenticating the identity of each other. As referred herein, a user may be an individual, a company, an organization, or any other entity that is a party to the data exchange via an electronic communication device.

Figure 1A:
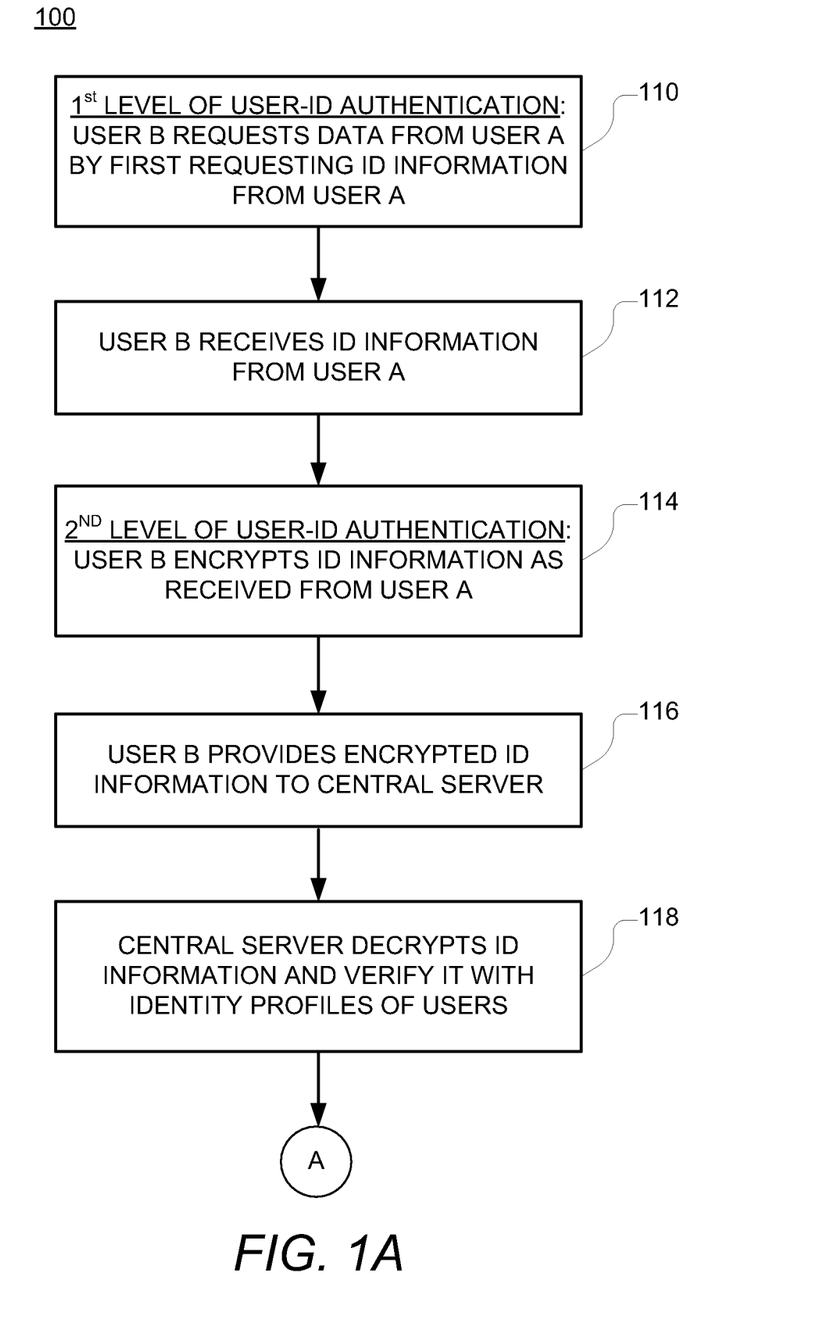
FIGS. 1A-C illustrates a process for securing a data exchange between two users via their electronic communication devices through multiple levels of user-identity authentication, in accordance with one embodiment.
Figure 1B:
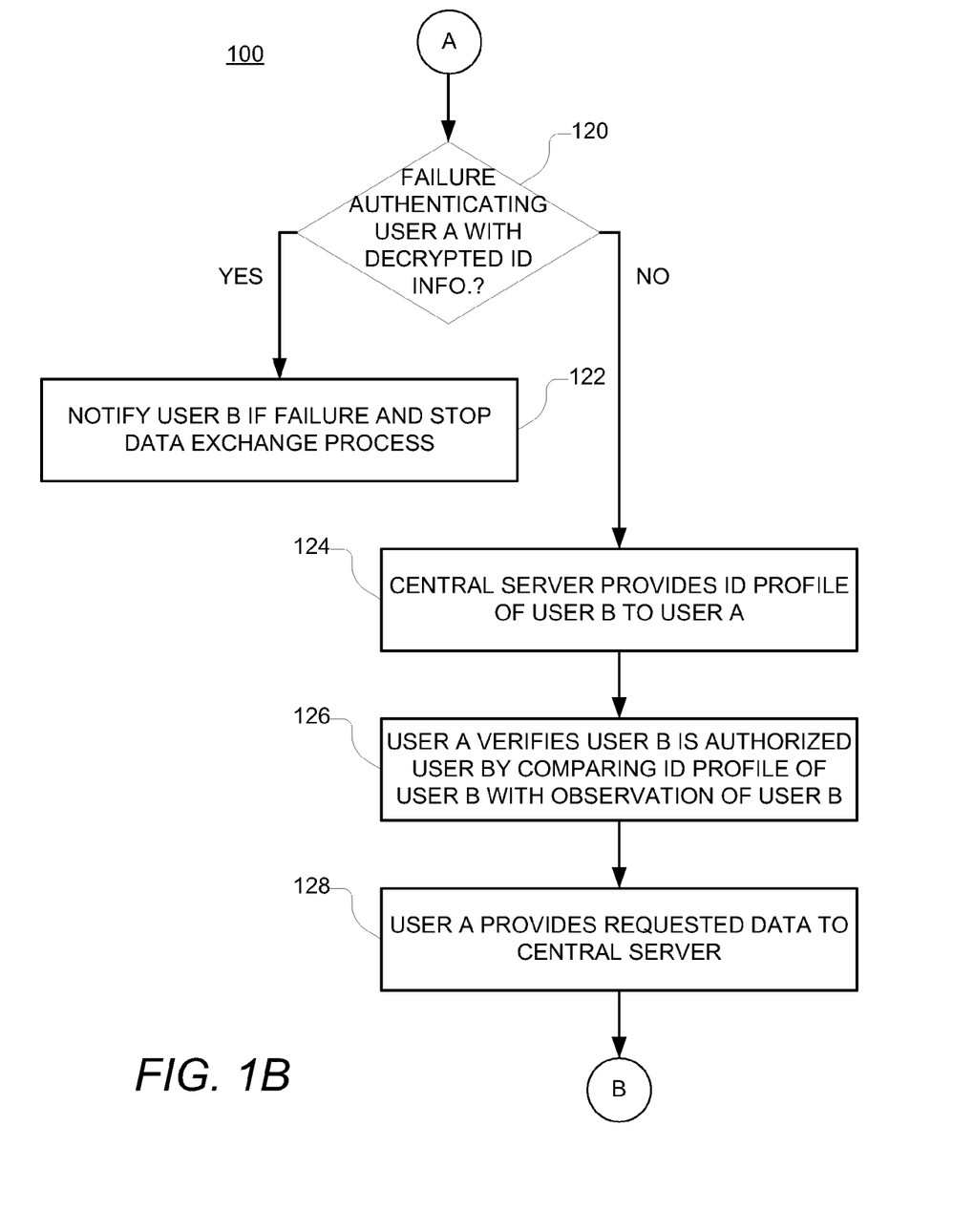
Figure 1C:
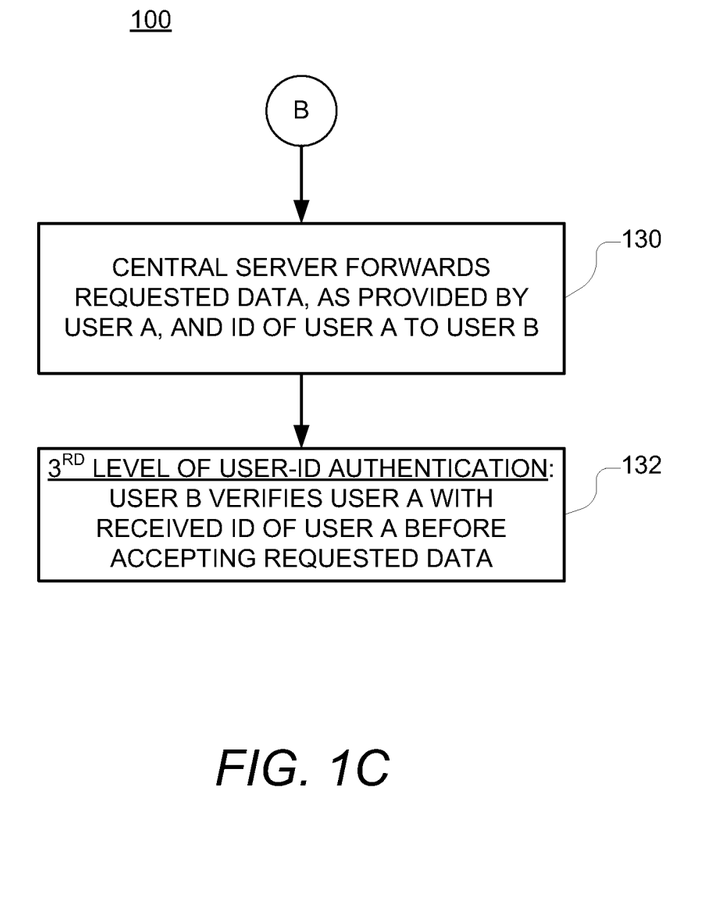

FIGS. 1A-C illustrates a process 100 for securing a data exchange between two users via their electronic communication devices through multiple levels of user-identity authentication, in accordance with one embodiment. For illustrative purposes only and not to be limiting thereof, FIGS. 1A-C are discussed with reference to the secure data exchange flow 200 in FIG. 2 and the exemplary electronic communication devices and central server therein. Thus, it should be understood that other electronic communication devices and/or computerized system may be used in lieu of those illustrated in FIGS. 1A-C without deviating from the scope of the present disclosure.

Referring to FIGS. 1A-C at 110, a first user (hereinafter, interchangeably, "User B" or "B") initiates a data exchange with a second user (hereinafter, interchangeably, "User A" or "A") by requesting to retrieve or obtain data from User A, the source of the data requested. Users A and B may be, for example, business associates or colleagues in the same company who wish to exchange confidential business strategies via their mobile phones or PDAs at a meeting, whereby such business strategies are documented in electronic word processing or spreadsheet format. As part of the data exchange initiation, a first level of user-identity authentication is implemented whereby User B requests A's identity information to be input to an electronic device (as illustrated at 210 in FIG. 2). This first level of user-identity authentication seeks to ensure that User A is a an authorized or trusted user from which trusted data may be obtained. Although personal identification number (PIN) and password are commonly used as identity information in most authentication schemes, biometric information provides a more secure alternative because it is much more difficult to duplicate due to its derivation from a user's intrinsic physical and/or behavioral traits. Thus, in one embodiment, User B requests A's identity information by requesting A's biometric information.

At 112, User B receives biometric information of User A by using an electronic communication device to scan in such information. For example, as illustrated at 210 in FIG. 2, User B uses a device 202 to scan in a fingerprint of User A (e.g., via a built-in or detachable fingerprint scanner on B's device). The device 202 may be a mobile phone, a video phone, a PDA, a desktop or laptop personal computer, a smart phone, or any other electronic device capable of receiving and transmitting electronic data. In place of A's scanned fingerprint, A's biometric information to be obtained may be A's facial characteristics (e.g., via built-in or detachable camera on B's device), iris or retina characteristics of A (e.g., via a built-in or detachable retina scanner on B's device), as the device 202 is used to scan A's eye, voice of the User A (e.g., via a built-in or attachable microphone to the User B's device), or any other desirable biometric information that is obtainable or retrievable from User A by the device 202 of User B.

At 114, once User B receives the identity information, such as biometric information, of User A, a second level of user-identity authentication is implemented whereby User B encrypts A's biometric information with B's encryption key to prepare for secure transmission of such biometric information. The encryption key may be symmetric or asymmetric with respect with the encryption/decryption key used by the central server 212 to decrypt the information.

At 116, as part of the second level of user-identity authentication, User B transmits or otherwise provides the encrypted biometric information of User A to a predetermined central server to request authentication of User A's biometric information, and thus the identity of User A. This is further illustrated at 220 in FIG. 2, which shows User B's device 202 transmitting information to a central server 212.

Figure 2:
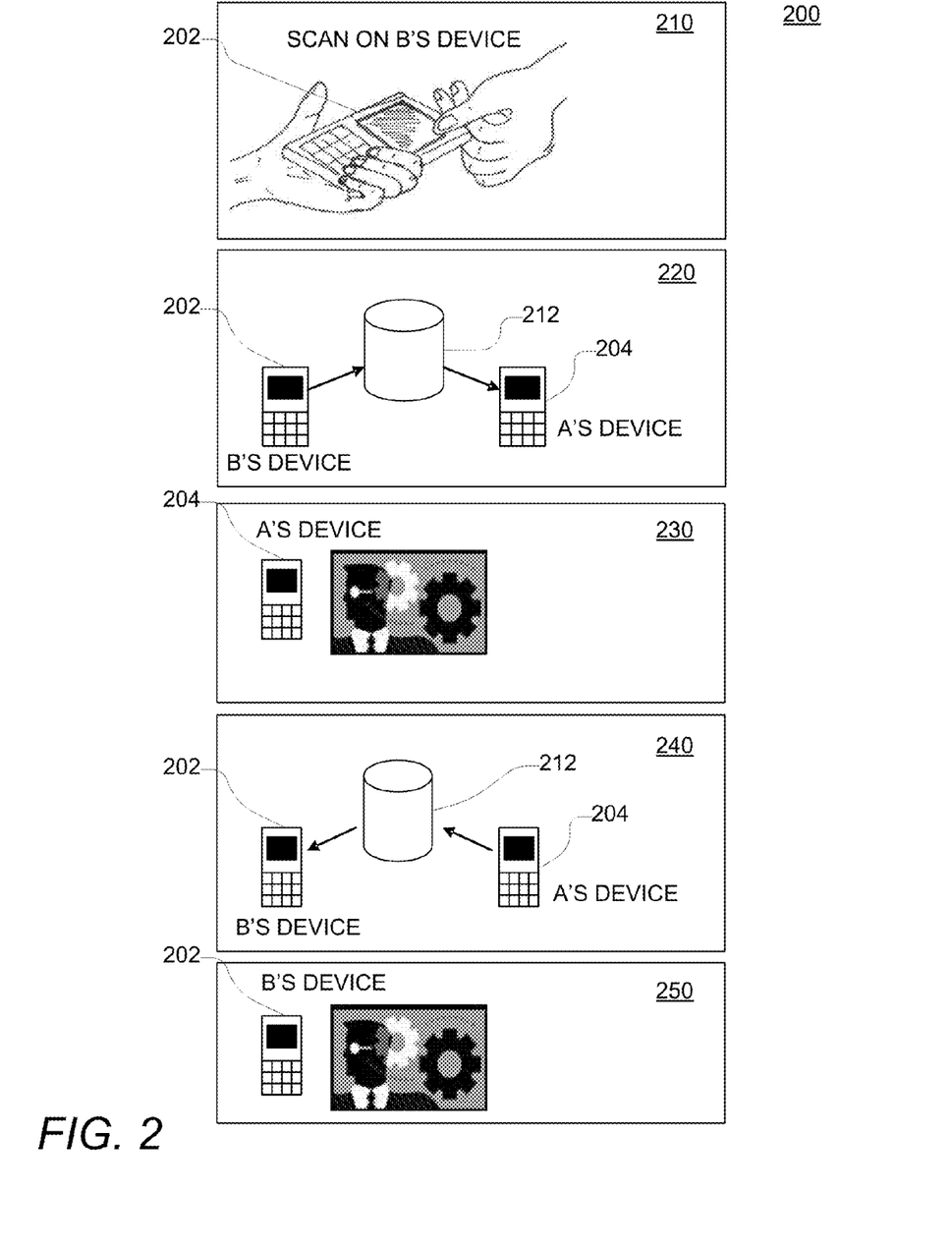
FIG. 2 illustrates a secure data exchange flow, in accordance with an embodiment.

At 118, the central server 212 receives, decrypts, and authenticates A's biometric information as encrypted and sent by User B. That is, the central server 212 operates to decrypt A's biometric information to make sure that it can decrypt the information and that the decrypted biometric information matches with A's biometric information previously stored in the central server 212. In the above example where Users A and B are business associates in the same company, the central server 212 is also maintained or administered under the authorization of the same company so that the company can properly provide authentication information for both Users A and B.

At 120, the central server 212 determines whether there is a failure in the authentication of User A. That is, the central server 212 determines whether there is a failure in decrypting A's biometric information and/or whether the resulting biometric information of User A does not match previously-stored biometric information of User A. A failure in decrypting A's biometric information may be indicative that User B does not have the proper encryption key to encrypt A's biometric information, which in turn may be indicative that User B is not an authorized user. For example, User B may be using a stolen identity or has been terminated from the same company of both Users A and B, but only User A is still retained by the company. Thus, User B does not have the proper encryption key to send A's biometric information to the central server 212, which is maintained by User A's company. A failure in the matching of biometric information may be indicative that User A is not recognized by the central server 212, which in turn may be indicative that User A is not an authorized user. For example, an unauthorized user may be attempting to gain access to company files or a secure area by pretending to be user A, but the unauthorized user is attempting to use biometric information that is different from User A's biometric information stored in the central server 12.

At 122, if there is a failure in the authentication of User A, the central server 212 may notify User B's device 202 of the failure and stops the data exchange process 100.

At 124, however, if the authentication of User A becomes successful, with the User A verified as an authorized user, the central server 212 transmits or otherwise provides an identity of User B to a pre-registered electronic communication device 204 of User A, as also illustrated at 220 in FIG. 2. In one embodiment, the central server 212 may encrypt such information before transmission for enhanced security. The transmitted B's identity may include an identity profile of User B that also allows User A to verify that User B is authorized to receive or obtain data from User A. The identity profile may include, for example, a two-dimensional (2D) or a rotating three-dimensional (3D) image of User B, a motion picture or video of User B, a registered trademark of B's company or government, an audio clip of B's voice, a description of physical unique features about B, and/or any other description of or information that is associated with B that allows A to identify B in real person as an authorized user or party to the data exchange.

At 126, accordingly, User A receives, decrypts, and uses User B's identity profile to confirm or verify in person that B is an authorized user to receive the requested data, as illustrated at 230 in FIG. 2. This may be done, for example, through observation of User B to determine whether observed physical features of User B match those in the identity profile of User B.

At 128, upon A's successful verification of B as an authorized user, User A selects the particular data or information that User B initially requested and uses User A's device 204 to transmit or otherwise provide it to the central server 212, as illustrated at 240 in FIG. 2. Again, information sent by User A may be encrypted by User A's device to provide added security.

At 130, the central server 212 forwards to User B the requested data as received from User A along with User A's identity profile, as retrieved from the central server 212 based on the earlier successful authentication of User A. Hence, as with the transmitted User B's identity, the transmitted User A's identity may include an identity profile of A that allows B to verify that A is authorized to provide or send the requested data to B.

At 132, a third level of user-ID authentication is implemented, whereby User B uses the identity profile of User A as sent from central server 212 to confirm that User A is an authorized user to send the requested data, as illustrated at 250 in FIG. 2. For example, the identity profile of User A may include a 3-D picture of A that was sent to User B's device 202, and User B may use such a picture to compare it against User A in person. Once User B is satisfied that User A is indeed the same person identified in the picture, User B may trust the requested data that is sent from User A's device 204. Thus, at this point, the user devices of both Users A and B contain each other's identity profile or identity information, which allow both parties or users to verify the identity (physical features, voice recognition, and/or other personal information) for secure data exchange between the parties.

Figure 3:
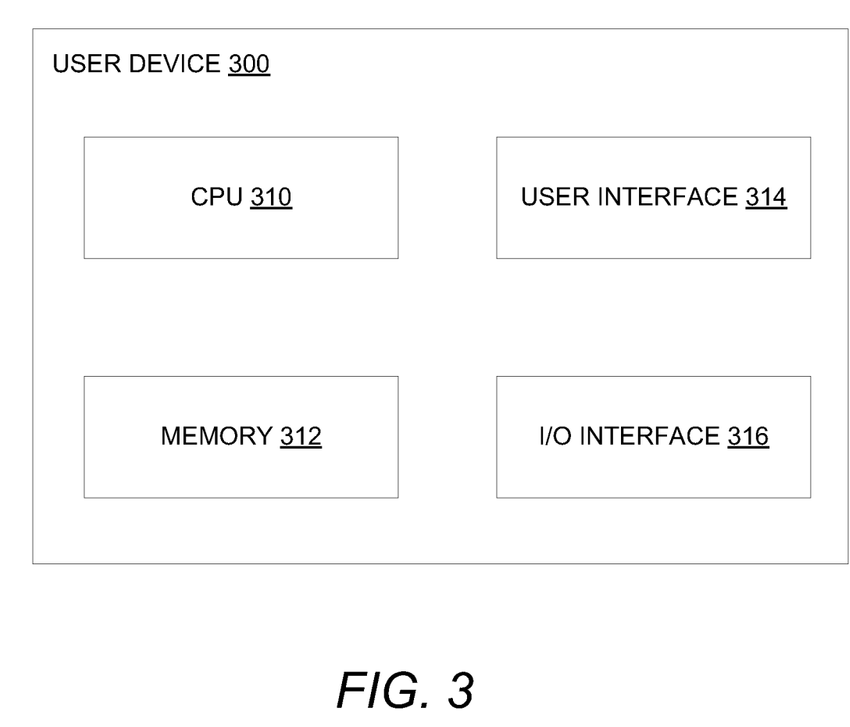
FIG. 3 illustrates a block diagram of a user device that may be used to represent a user device.

FIG. 3 illustrates a block diagram of a user device 300 that may be used to represent a user device (202 or 204). The user device 300 includes, among other components, a central processing unit (CPU) 310, a memory 312, a user interface 314, and an I/O interface 316. A communication bus (not shown) may be implemented to provide connections between the aforementioned components and other components in the user device 100 in a known manner.

The CPU 310 includes one or more processors of any of a number of computer processors, such as processors from Intel, AMD, or Cyrix. Each processor is coupled to or includes at least one memory device, such as a data storage medium (DSM). The processor is operable to execute computer-executable program instructions stored in the DSM, such as program code of applications, to run the applications. The processor-executable program instructions include code from any suitable computer-programming language, such as C, C++, C#, Java, or the like.

The memory 312 may be implemented as a DSM having stored thereon software applications, programs, or modules. These software applications include processor-executable instructions that provide any number of functions and operations of the user device 300. Examples of a DSM for the memory 312 include but are not limited to an electronic, optical, magnetic, or other storage device capable of storing data content and providing a processor, such as the CPU 310, with computer-readable instructions. Thus, the DSM may be a computer-readable medium. Other examples of a suitable DSM include, but are not limited to, a floppy disk, CD-ROM, DVD, magnetic disk, memory chip, ROM, RAM, an ASIC, any optical medium, any magnetic tape or magnetic medium, or any other medium from which a processor is operable to read instructions.

In one example, the memory 312 includes software applications to process biometric information scanned or otherwise received by the user device. Thus, the user device 300 includes a user interface 314, such as a scanning device, that is equipped with one or biometric sensors that is operable to sense or scan in one or more types of biometric information, such as fingerprint scanning, iris scanning, facial scanning and recognition, and/or any other biometric scanning available. Alternatively, software applications or drivers for interacting with the user interface 314 (and biometric sensors therein) and processing biometric information retrieved therefrom may be stored in a memory that is resident in the user interface 314 rather than in the memory 312. Also, a user device may be programmed to comply with governmental privacy laws by not being capable of locally storing the scanned biometric information in the device. Instead, once such biometric information is sensed or scanned in the user device, it is uploaded to the central server 212 for authentication purposes and also removed from the user device.

The user device 300 also includes an input/output interface 316 that is operable to communicate with the central server 212 via a wired and/or wireless network. For example, the user device may be connected to the central server 212 via a wired network, such as a land area network (LAN), a wide area network (WAN), or any other wired network available. Such a connection may be done through an Ethernet connector, a universal serial bus (USB) connector, or any other connector available as part of the I/O interface 316 on the user device. Alternatively or in addition, the user device may be connected to the central server 212 via a wireless network, such as global system for mobile communications (GSM), code division multiple access (CDMA), time division multiple access (TDMA), universal mobile telecommunications system (UMTS), high speed downlink packet access (HSDPA), WiFi, worldwide interoperability for microwave access (WiMAX), Bluetooth, or any other wireless network or wireless protocol available via a corresponding transmitter or receiver (or transceiver) in the I/O interface 316.

Accordingly, user devices as described herein are operable to share different types of information based on authorities given to such devices, and the authority given to each device is based on the user assigned or associated with such a device. To that effect, in one embodiment, user devices are provided with different authorization rules or levels. The user devices are then distributed to different authorized users so that only users with same authorization rules or levels may communicate and exchange information via their respective user devices. Alternatively, user devices may be programmed by a host system, such as the central server 212, to have different authorization rules or levels based on each device's unique identification (ID). For example, if the user device is a mobile or cellular phone, it may be identified by an international mobile equipment identifier (IMEI). Similarly, if the user device is a laptop computer, it may be identified by its unique serial number.

Each user device is also operable to provide an adequate user interface to effectively accommodate the multiple authentication levels in the secure data exchange flow 200 described above. For example, when a user image is used as biometric information for identification and authentication, the user device may include an adequate graphic display (e.g., a LCD or OLED screen) and/or one or more multimedia functionalities for displaying a 3D or 2D image of a data exchange party to authenticate such a party as an authorized user, quality audio playback. In another example, when a user's voice is used as biometric information for identification and authentication, the user device may include quality audio voice playback (e.g., similar to that of an MP3 player or other multimedia mobile players) for enabling accurate voice playback or voice recognition of a data exchange party to authenticate such a party as an authorized user.

Referring now to the central server 212, in one embodiment, it may be a central information server that is maintained by a centralized or host entity. The central server 212 provides security features of authentications and encryptions and also storage of user information relating to each authorized user, for example, in the form of an identity profile noted above, so that such information may be used to implement the multiple user authentication levels in the secure data exchange flow 200 described above. The identity profile or user information of each user (e.g., Users A and B) is provided to the central server 212 through registration of the user by an authorization body, such as a law enforcement agency, a corporation, an academic institution, a health care provider or administrative body, or any private, public, or governmental entities that is interested in or concerned about secrecy and/or privacy of data being exchanged between its employees or authorized users.

Figure 4:
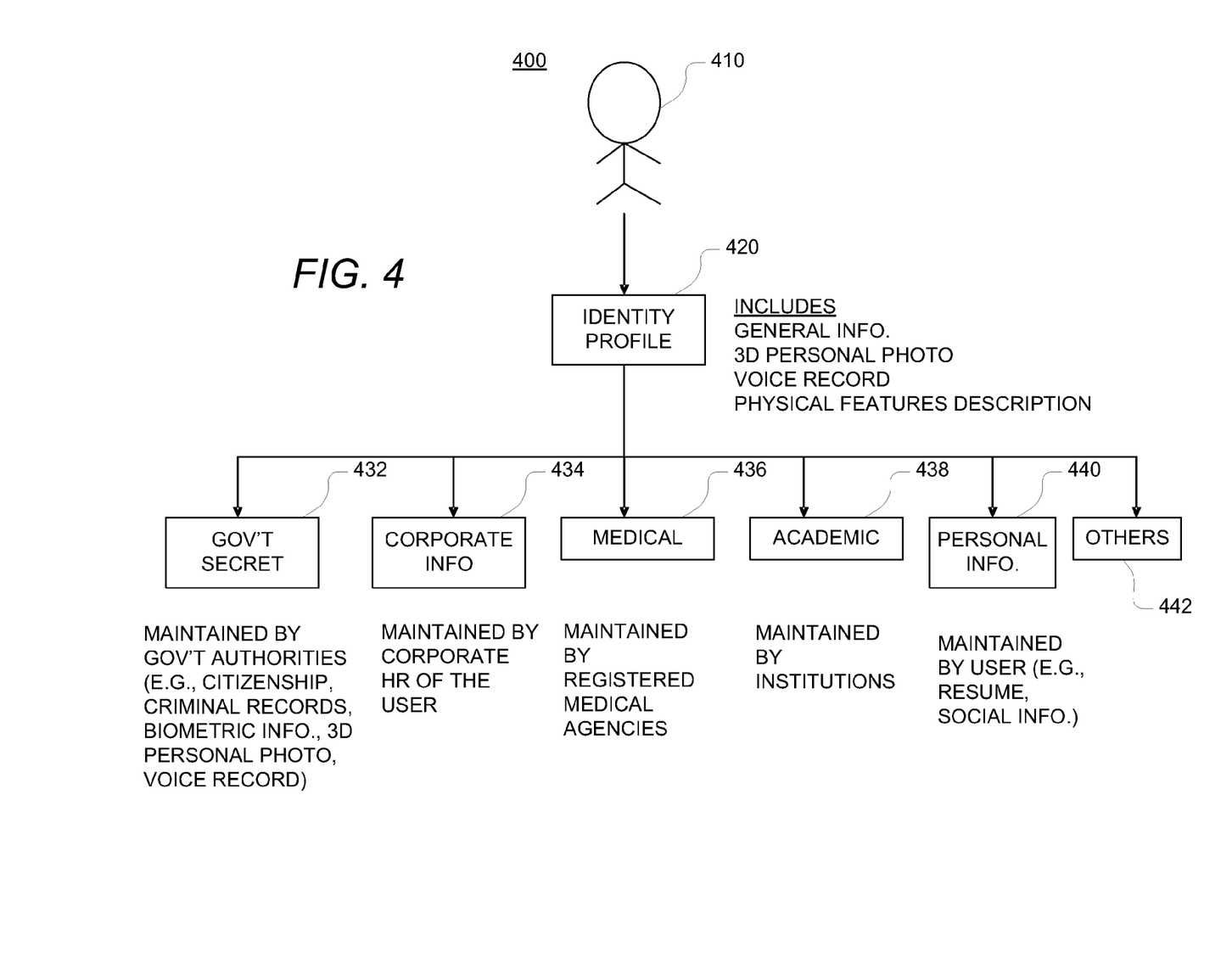
FIG. 4 illustrates an informational chart of a user's identity profile that may be created and/or populated by one or more authorization bodies, in accordance with one embodiment.

FIG. 4 illustrates an informational chart 400 of a user's identity profile that may be created and/or populated by one or more authorization bodies, provided to the central server 212 for storage through registration of the user therein, and shared by one or more authorization bodies to allow such a user to engage in an exchange of data or information with other authorized users while maintaining the confidential or proprietary nature of such data exchanged. As illustrated, a user 410 has an associated identity profile 420 with information identifying the user therein. The identity profile 420 includes, for example, general information about the user 410 (citizenship, criminal records, driver's license number), a 3D or 2D picture or image (still or moving) of the user 410, a voice recording of the user 410 for voice recognition, a fingerprint recording of the user 410, an iris recording of the user 410, and/or any other personal recording of the user 410 that may be used for biometric identification purposes.

User information in the identity profile 420 may be provided or populated by one or more authorization bodies, such as a governmental body 432 interested in or concerned with maintaining the secrecy or confidentiality of the data exchanged between its authorized users, a corporate entity 434 interested in or concerned with maintaining trade or business secrets in the data exchanged between its authorized users, a medical provider or administrator 436 interested in or concerned with maintaining the privacy of client or patient information exchanged between its employees, an academic institution 438 (e.g., high school, colleges, universities) interested in or concerned with maintaining the confidentiality of student academic records exchanged between different school departments or with the students, the user 410 who wishes to maintain privacy or confidentiality of certain personal information (shown as 440), such as a user's social security number, driver's license number, resume information, and social information. Again, as noted above, user information in the identity profile 420 may be contributed by others 442 that are also interested in or concerned with protecting such user information for security, confidentiality, and/or privacy.

As noted earlier, the identity profile 420 of a user 410 may be stored in the central server 212. Accordingly, the central server 212 may be updated with multiple levels or classifications of user information from different authorization bodies (e.g., 432-438) and from personal information 440 provided by the user 410. To ensure data integrity, each authorized user is registered once in the central server 212 with one identity profile. Furthermore, certain content or user information in a user's identity profile may be updated by one or more authorization bodies, whereas other content may be updated by the registered user.

Accordingly, as exemplified above, Users A and B may be, for example, business associates or colleagues in the same company who wish to exchange confidential business data. From the identity information exchange as described herein, Users A and B are provided with each other's identity profile that may include contact information, rotating 3D company/country logo imprinted with security features (e.g., watermark) to prevent impersonations or fraudulent copying, rotating 3D image of the other party, and/or sample audio replay of the voice of the other party for verification purposes.

In another example, User B may be a law enforcement officer, such as one manning a sobriety checkpoint, and User A may be a motorist stopped by User B (the law enforcement officer). In this example, User B as a law enforcement officer may be provided with an identity profile of User A from a centralized police database or server. Hence, in the process 100 illustrated in FIGS. 1A-C, the operation at 128 is not implemented because the central server already has information to be requested or desired by User B, the law enforcement officer. The identity profile allows User B to verify, for example, that User A is of legal age, if User A was found to have been drinking. The identity information may also include physical features of User A and any driving or criminal records that User A may have to enable User B to verify and legally apprehend User A as needed to avoid false identification and false arrest. Likewise, User A may be provided from the centralized police database with an identity profile of User B that allows User A to verify that User B is indeed a true law enforcement officer and not an impersonator.

In still another example, User B may be a job interviewer and User A a job interviewee. User B may be provided with an identity profile of User A, which may include a resume, working history, and academic records of User A, so that User B may verify the veracity of the User A's answers during the interview. Likewise, the User A may be provided with an identity profile of User B, which may include a history of User B at the company at which User A is interviewing and a history of such a company, so that User A can further determine whether such a company is legitimate and the job opening will be a stable one. In this instance, the identity profiles of both Users A and B may be provided by, for example, an independent employment agency or company. Accordingly, Users A and B may be a myriad of different users partying to a data exchange that involves confidential data and authentication of authorized users for receiving and transmitting such data.

In yet another example, User B may be emergency personnel, such as an emergency doctor, a paramedic, or a firefighter, and User A a victim or someone who is in need of medical assistance or other types of assistance. Furthermore, it may not be possible for User A to perform cross-authentication to authenticate User B. For example, User A may be unconscious or otherwise incapacitated to authenticate User B. Then, User B may be previously set up in the central server with different authorization rules or levels to allow User B to obtain medical records of User A from the central server without requiring User A to first authenticate User B. That is, with reference to the process 100 in FIGS. 1A-C, the operations at 124-128 are skipped. Consequently, at 130, the requested data to be forwarded to User B includes medical records of User A along with an identity profile of User A to allow User B to authenticate User A (at 132) and make sure that the received medical records are those of User A in order to medically attend to or otherwise assist User A.

Figure 5:
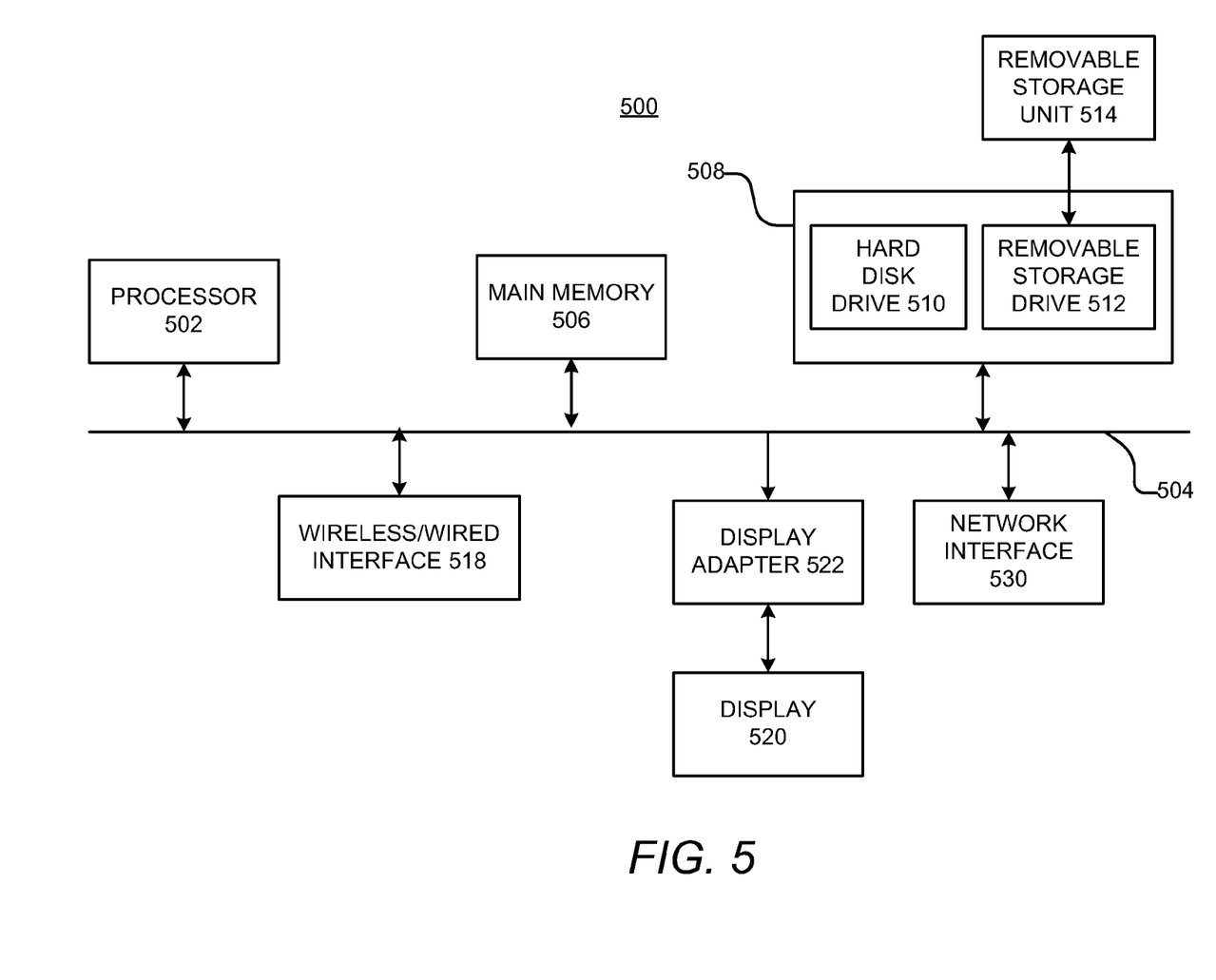
FIG. 5 illustrates a block diagram of a computerized system that is operable to be used as a platform for implementing the central server, in accordance with one embodiment.

FIG. 5 illustrates a block diagram of a computerized system 500 that is operable to be used as a platform for implementing the central server 212 describe above. The computer system 500 includes one or more processors, such as processor 502, providing an execution platform for executing software. Thus, the computerized system 500 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 502 are communicated over a communication bus 504 or through point-to-point links with other components in the computer system 500.

The computer system 500 also includes a main memory 506 where software is resident during runtime, and a secondary memory 508. The secondary memory 508 may also be a computer-readable medium (CRM) that may be used to store software programs, applications, or modules that provide the security features of authentications and encryptions and storage of user information for implementing the secure data exchange flow 200 illustrated in FIG. 5. The main memory 506 and secondary memory 508 (and an optional removable storage unit 514) each includes, for example, a hard disk drive 510 and/or a removable storage drive 512 representing a floppy diskette drive, a magnetic tape drive, a compact disk drive, etc., or a nonvolatile memory where a copy of the software is stored. In one example, the secondary memory 508 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions.

The computer system 500 also includes a display 520 connected via a display adapter 522, user interfaces comprising one or more input devices 518, such as a keyboard, a mouse, a stylus, and the like. However, the input devices 518 and the display 520 are optional. A network interface 530 is provided for communicating with other computer systems via a network, such as the Internet or an intranet. For example, if the computerized system 500 is used to implement the client system, the network interface 530 may be used to provide inputs to the test systems via a network and receive resource usage traces from the test systems. If the computerized system 500 is used as a hardware platform for the native hardware or virtual systems, the network interface 530 may be used to communicate with the client system to receive inputs for running the benchmark suite and provide resulting resource usage traces to the client system.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims, and their equivalents, in which all terms are meant in their broadest reasonable sense unless otherwise indicated.

What is claimed is:

1. A method of securing a data exchange, comprising:
   requesting data from a first user;
   receiving identity information of the first user as a result of the requesting;
   encrypting the identity information of the first user;
   transmitting the identity information of the first user as encrypted to request authentication of the identity information; and
   receiving the requested data along with an identity profile of the first user for use by a second different user to authenticate the first user, in person, based on a physical feature of the first user contained in the identity profile,
   wherein receiving the requested data along with the identity profile of the first user comprises receiving the requested data along with the identity profile of the first user from a central server.

2. The method of claim 1, wherein requesting data from the first user comprises:
   requesting the identity information of the first user from the first user.

3. The method of claim 1, wherein the method is performed by a mobile electronic device.

4. A method of securing a data exchange, comprising:
   receiving a request for data from a first user at a second different user's device;
   providing user identity information of the first user in response to the request for data;
   receiving a user identify profile of the first user;
   verifying the first user, at the second different user's device, based on a physical feature of the first user contained in the identity profile; and
   upon successfully verifying the first user, providing the data in response to the request for data,
   wherein providing the data in response to the request for data comprises providing the data to a central server for transmission to the first user.

5. The method of claim 4, further comprising:
   receiving a request for the user identity information as part of receiving the request for data.

6. The method of claim 4, further comprising:
   decrypting the received user identity profile for the verifying.

7. The method of claim 4, wherein at least some of the steps in the method is performed by mobile electronic device different from a data-requesting source.

8. A method of securing a data exchange, comprising:
   storing a first user identity profile of a first party to the data exchange, the first user identity profile establishing a user identity of the first party;
   storing a second user identity profile of a second party to the data exchange, the second user identity profile establishing a user identity of the second party;
   receiving initial user identity information from the first party, wherein the initial user identity information is for identifying the second party;
   verifying the initial user identity information with the second user identity profile associated with the second party;
   providing to the second party the first user identity profile associated with the first party for use by the second party to verify the first party as an authorized party for the data exchange;
   receiving requested data from the second party; and
   providing the requested data along with the second user identity profile to the first party, wherein the second user identity profile is for use by the first party to verify the user identity of the second party,
   wherein the method is performed by a third party central server for both the first and second parties.

9. The method of claim 8, wherein verifying the initial user identity information comprises:
   verifying whether the initial user identity information matches with user identity information in a plurality of user identity profiles stored; and
   upon successfully verifying the initial user identity information with the second user identity profile, which is one of the plurality of user identity profiles stored, providing to the second party the first user identity profile.

10. The method of claim 9, wherein receiving the initial user identity information from the first party comprises:
    receiving the initial user identity information encrypted by the first party; and
    decrypting the initial user identity information for verifying the initial information.

11. The method of claim 8, wherein the initial user identity information includes biometric information of the second party.

12. The method of claim 8, further comprising:
the first party verifying the second party as the authorized party to the data exchange by comparing information included in the provided second user identity profile with user identity information of the second party as observed by the first party.

13. The method of claim 10, wherein providing the requested data along with the second user identity profile to the first party comprises:
encrypting the requested data and the second user identity profile; and
providing the requested data and the second user identity profile as encrypted to the first party.

14. The method of claim 8, wherein,
receiving the initial user identity information from the first party comprises receiving the initial user identity information from a first electronic mobile device operated by the first party; and
providing to the second party the first user identity profile associated with the first party comprises providing the first user identity profile to a second electronic mobile device operated by the second party.

* * * * *

UNITED STATES PATENT AND TRADEMARK OFFICE
CERTIFICATE OF CORRECTION

| | | |
|---|---|---|
| PATENT NO. | : 8,818,334 B2 | Page 1 of 1 |
| APPLICATION NO. | : 12/273766 | |
| DATED | : August 26, 2014 | |
| INVENTOR(S) | : Hoh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1363 days.

Signed and Sealed this
Twenty-fifth Day of August, 2015

Michelle K. Lee
*Director of the United States Patent and Trademark Office*